United States Patent
Senyuta et al.

(10) Patent No.: US 9,322,080 B2
(45) Date of Patent: Apr. 26, 2016

(54) METHOD FOR PRODUCING ALUMINA

(75) Inventors: Aleksandr Sergeevich Senyuta, St. Petersburg (RU); Andrey Vladimirovich Panov, St. Petersburg (RU); Aleksandr Gennad'evich Suss, St. Petersburg (RU); Aleksandr Aleksandrovich Damaskin, Murino (RU)

(73) Assignee: United Company RUSAL Engineering and Technology Centre LLC, G. Krasnoyarsk (RU)

( * ) Notice: Subject to any disclaimer, the term of this patent is extended or adjusted under 35 U.S.C. 154(b) by 0 days.

(21) Appl. No.: 14/417,724

(22) PCT Filed: Aug. 1, 2012

(86) PCT No.: PCT/RU2012/000630
§ 371 (c)(1),
(2), (4) Date: Jan. 27, 2015

(87) PCT Pub. No.: WO2014/021729
PCT Pub. Date: Feb. 6, 2014

(65) Prior Publication Data
US 2015/0203936 A1    Jul. 23, 2015

(51) Int. Cl.
*C22B 21/00* (2006.01)
*C01F 7/22* (2006.01)
*C01F 7/56* (2006.01)
*C01F 7/30* (2006.01)
*C22B 3/10* (2006.01)

(52) U.S. Cl.
CPC ............... *C22B 21/0015* (2013.01); *C01F 7/22* (2013.01); *C01F 7/306* (2013.01); *C01F 7/56* (2013.01); *C22B 3/10* (2013.01)

(58) Field of Classification Search
None
See application file for complete search history.

(56) References Cited

U.S. PATENT DOCUMENTS 4,222,989 A    9/1980   Belsky et al.
5,993,758 A *  11/1999  Nehari et al. .................. 423/126

FOREIGN PATENT DOCUMENTS

| | | |
|---|---|---|
| DE | 562498 | 10/1932 |
| SU | 1161467 | 6/1985 |
| WO | WO 2012126092 A1 * | 9/2012 |
| WO | WO 2013037054 A1 * | 3/2013 |

OTHER PUBLICATIONS

D. Elsner et al., "Alumina via hydrochloric acid leaching of high silica bauxites—process development," Light Metals, 1984, pp. 411-426.

* cited by examiner

*Primary Examiner* — Melissa Swain
(74) *Attorney, Agent, or Firm* — Hogan Lovells US LLP

(57) ABSTRACT

The invention relates to acid methods for producing alumina for use in processing low-grade aluminum-containing raw materials. The method provides treating aluminum-containing raw materials with hydrochloric acid, crystallizing aluminum chloride hexahydrate by evaporating the supernatant chloride solution, and thermally decomposing the aluminum chloride hexahydrate to form aluminum. Crystallization is carried out with the addition of calcium chloride.

4 Claims, No Drawings

METHOD FOR PRODUCING ALUMINA

This application is a U.S. National Phase under 35 U.S.C. §371 of International Application PCT/RU2012/000630, filed on Aug. 1, 2012. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

The invention relates to metallurgy, in particular to acid methods for producing alumina, and can be utilized in processing low-grade aluminium-containing raw material.

A process is known for producing alumina from high-silica bauxites by hydrochloric acid leaching, said process involving the calcination of an aluminium-containing raw material at a temperature up to 700° C., the treatment thereof with hydrochloric acid, salting out of aluminium chloride by saturating a clarified chloride solution with gaseous hydrogen chloride, calcination of the aluminium chloride to yield aluminium oxide, and mother liquor pyrohydrolysis at the acid treatment and salting out step with the recovery of hydrogen chloride (Elsner D., Jenkins D. H., and Sinha H. N. Alumina via hydrochloric acid leaching of high silica bauxites—process development. Light metals, 1984, p. 411-426).

According to said process, aluminium chloride hexahydrate separated out of solution due to the salting out with gaseous hydrogen chloride; the phosphorus content in the finished product, however, exceeded by 1.5 times the allowable limits for smelter grade alumina.

A deficiency of said process also includes the need to produce dry hydrogen chloride gas in the subsequent technological process stages in order to recycle it to the salting out process stage, said deficiency that in some cases overcomplicates the process and increases the thermal energy consumption.

The closest to claimed process is the hydrochloric acid alumina production process comprising the acid treatment of the pre-calcined raw material, evaporation of the clarified chloride solution with the crystallization of aluminium chloride hexahydrate ($AlCl_3 \cdot 6H_2O$) followed by the calcination thereof to the oxide, which was called 'crude alumina' by the authors (Handbook for Metallurgist on Non-Ferrous Metals: Alumina Production Processes [in Russian]. Metallurgiya: Moscow, 1970, pp. 236-237) because of the high content of iron and other impurities (apart from silicon). This intermediate material was then processed by the conventional alkaline Bayer process in order to remove iron, phosphorus, and other impurities to yield smelter grade alumina.

It is virtually impossible, however, to assure a high-purity target product during the crystallization of $AlCl_3 \cdot 6H_2O$ from a solution containing iron chlorides and other impurity metals, together with phosphorus. Therefore, it is necessary to dissolve aluminium chloride hexahydrate in water followed by its reprecipitation; this results in unavoidable thermal energy consumption to evaporate the water introduced additionally into the cycle.

Other deficiencies of said process also include the excessive complexity of process design, high gross energy cost during its realization, chloride migration from the acid cycle to the alkali cycle, and additional alkali losses (up to 36-37 kg/tonne of alumina) related thereto. These are reasons why the process did not find industrial application.

The invention is based on the object comprising the development of a method for producing smelter grade alumina from a low-grade raw material, which allows low-grade, high-silica ores and waste to be processed.

The technical result is an improved alumina quality and the reduction of energy usage.

The above technical result is achieved in that in the method for producing alumina, comprising the treatment of aluminium-containing raw materials with hydrochloric acid, crystallization of aluminium chloride hexahydrate by evaporating the clarified chloride solution, and thermal decomposition of aluminium chloride hexahydrate to yield alumina, the crystallization proceeds with the addition of calcium chloride (where the ratio of the total calcium chloride weight to the estimated alumina weight in the clarified solution is 2-4) in the presence of aluminium chloride hexahydrate seed crystals with an average particle size of 250-500 μm.

Carrying out the crystallization with the addition of calcium chloride, where the ratio of the total calcium chloride weight to the estimated alumina weight in the cleared solution is 2-4, in the presence of aluminium chloride hexahydrate seed crystals with an average particle size of 250-500 μm makes it possible to control crystal growth and to prevent the entry of phosphorus into aluminium chloride hexahydrate and later into alumina.

The alumina production process is carried out as follows:

The clarified aluminium chloride solution after leaching of natural aluminium-containing raw material with hydrochloric acid, separation of the insoluble residue, and pre-evaporation to the saturation point (with a concentration of about 30% in terms of $AlCl_3$) is mixed with a 50-70% $CaCl_2$ solution (700-900 g/L) based on a further decrease in its concentration below 30-40% in the mixed solution. The crystallization is carried out in the presence of aluminium chloride hexahydrate seed crystals with a particle size of 250-500 μm, by continuing the evaporation and maintaining the salt precipitation rate to provide the desired particle size of the product crystals. The crystallization process ends once the $CaCl_2$ concentration in mother liquor increases up to the initial level of 700-900 g/L while the $Al_2O_3$ content drops to 5-10 g/L. At that point, more than 90% of $Al_2O_3$ entering the process separates out with the salt. The resulting slurry is separated; the mother liquor is recycled to the start of the process, and the aluminium chloride hexahydrate crystals are taken to alumina production using thermal decomposition.

The method for producing alumina is further illustrated with specific examples.

Example 1

Kaolin clay with a content of essential constituents (%): $Al_2O_3$ 36.4; $SiO_2$ 45.3; $Fe_2O_3$ 0.78; $TiO_2$ 0.51; CaO 0.96; MgO 0.49; and $P_2O_5$ 0.12, was treated with a 20% hydrochloric acid solution at a liquid to solid ratio of L:S=4:1 while stirring at 110-115° C. for 3 hours. Upon completion of the process, the slurry was filtered. The clarified chloride solution was evaporated in a flask to an $AlCl_3$ concentration of 31%, then the heated 60% calcium chloride solution was added gradually until aluminium chloride hexahydrate crystals began to be isolated, and then aluminium chloride seed crystals with a particle size of 250-500 μm (from previous tests) were added in the amount of a twofold estimated weight of $AlCl_3 \cdot 6H_2O$, introduced into the process with the clarified chloride solution, and evaporation continued for 1 hour. The resulting crystals were washed on a filter with 38% hydrochloric acid and calcined at 1000° C. The $P_2O_5$ content in the resulting alumina was less than 0.001%, and the average particle size of the product was 82.3 µm. The values fully comply with smelter grade alumina standards.

Example 2

The experiment was repeated under the same conditions except that calcium chloride was omitted. The $P_2O_5$ content in the resulting alumina was 0.004%, and the average particle size of the product was 71.2 µm; i.e. non-compliance occurred in terms of the impurity content.

Example 3

The experiment was repeated under the conditions of Example 1 except that aluminium chloride hexahydrate seed crystals with a particle size of 100-250 µm were added. The $P_2O_5$ content in the resulting alumina was less than 0.002%, and the average particle size of the product was 52.2 µm; i.e. non-compliance occurred in terms of the particle-size distribution.

A comparative evaluation demonstrated that the claimed process makes it possible to save up to 36% of the thermal energy compared with the prior art.

The invention claimed is:

1. A method for producing alumina comprising:
   a) treating an aluminium-containing raw material with hydrochloric acid;
   b) crystallizing aluminium chloride hexahydrate by evaporating off clarified chloride solution; and
   c) thermally decomposing aluminium chloride hexahydrate to yield alumina,
   wherein the crystallizing is carried out by adding a calcium chloride solution in a presence of aluminium chloride hexahydrate seed crystals having an average particle size of 250-500 µm;
   wherein a ratio of calcium chloride weight to an estimated alumina weight in the clarified chloride solution is 2:4.

2. The method of claim 1 wherein the calcium chloride solution is a 50-70% calcium chloride.

3. The method of claim 1 wherein the hydrochloric acid is a 20% hydrochloric acid solution.

4. the method of claim 1 wherein the hydrochloric acid is a 38% hydrochloric acid solution.

* * * * *